A. W. CLARKSON.
Improvement in Cotton and Hay Presses.

No. 124,035.  
Patented Feb. 27, 1872.

Witnesses:  
John Becker  
Geo. H. Mabee

Inventor:  
A. W. Clarkson  
per  
Attorneys.

UNITED STATES PATENT OFFICE.

ADAM W. CLARKSON, OF DUE WEST, SOUTH CAROLINA.

IMPROVEMENT IN COTTON AND HAY PRESSES.

Specification forming part of Letters Patent No. 124,035, dated February 27, 1872.

Specification describing a new and Improved Cotton and Hay Press, invented by ADAM W. CLARKSON, of Due West, in the district of Abbeville and State of South Carolina.

Figure 1:
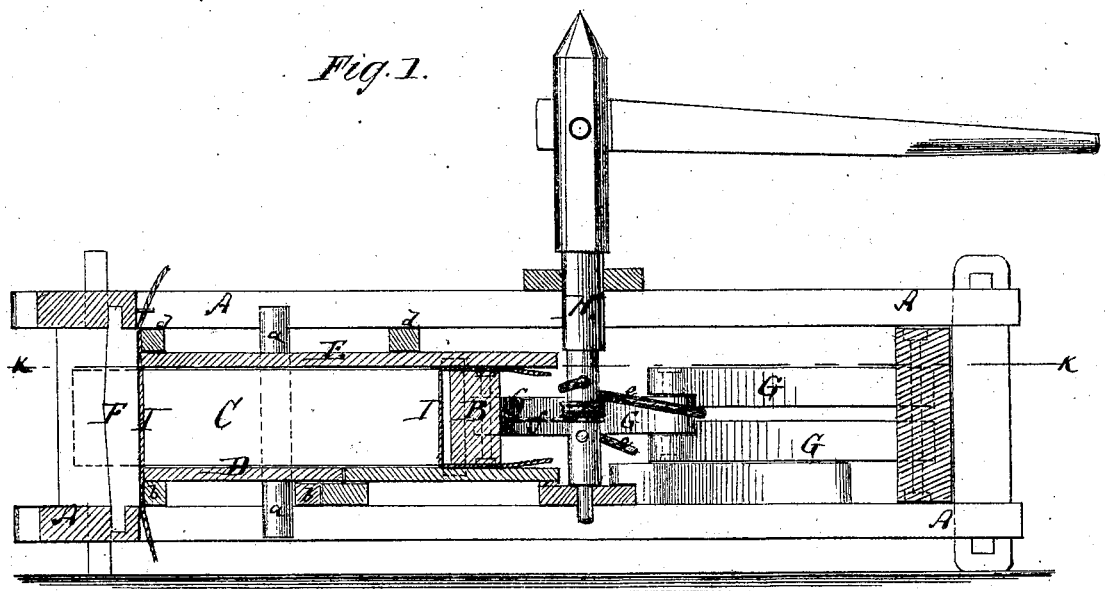
Figure 2:
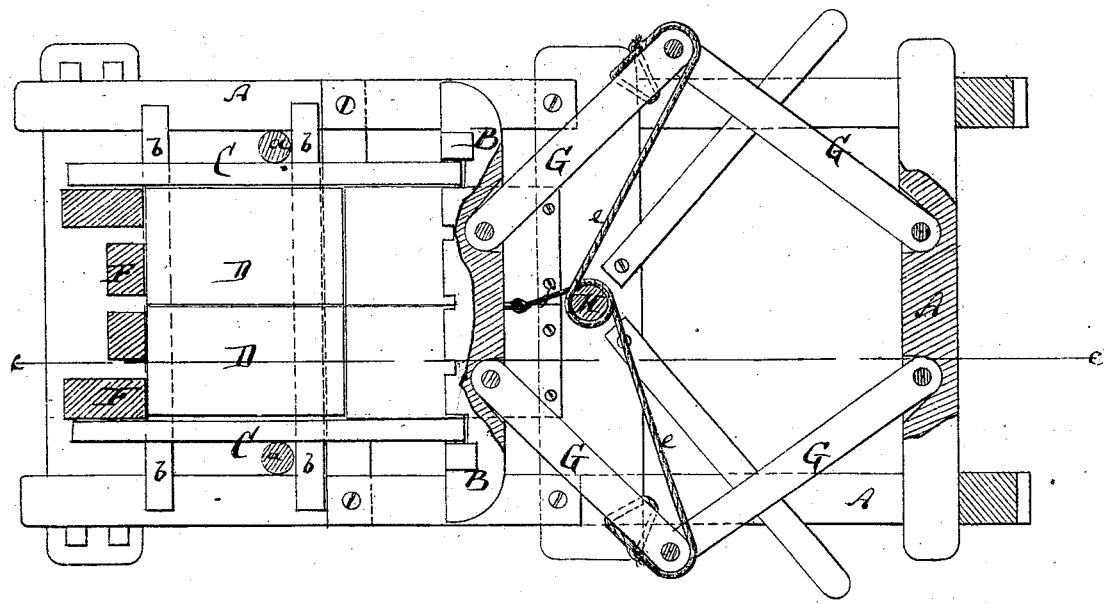

Figure 1 represents a longitudinal section of my improved press, the line $c\,c$, Fig. 2, indicating the plane of section. Fig. 2 is a horizontal section of the same on the line $k\,k$, Fig. 1.

Similar letters of reference indicate corresponding parts.

The invention consists in combining the follower of the press with toggle-levers, and with sliding side pieces, and with an operating capstan, all as hereinafter more fully described.

A in the drawing represents the frame of the press, made of wood, and of requisite size. B is the press-follower, made horizontally movable. C C are the side pieces; D, the bottom pieces; E, the top planks of the press; and F is the immovable end opposite the follower. The end piece F is firmly secured to the end of the frame. The sides C C lean against it, and fit with their inner ends into grooves that are formed in the face of the follower. When the follower moves toward the end F it pushes the side pieces C along friction-rollers $a\,a$, bearing against their outer surfaces to hold them in place. The bottom D is held upon a removable cross-bar, $b$, and the top planks are held down by removable cross-bars $d\,d$. The follower is connected with toggle-levers G G, which are at their outer ends pivoted to the frame A, and by ropes or chains $e\,e$ connected with an upright capstan, H. By a rope, F, the capstan is also directly connected with the follower.

When rotary motion is, by suitable means, imparted to the capstan, so that it will wind up the ropes or chains $e\,e$ and unwind $f$, the follower will, by the expanding toggles, be forced toward the end $f$, and compress whatever is between the two. After a bale has been thus formed, the sides of the press can be withdrawn, the bottom and top also opened, and the bale tied.

Linen, or equivalent material, I, Fig. 1, for forming a bag around the bale, may, previous to pressing, be placed against the end F and follower, and can, after pressure, be conveniently tied round the bale.

When the bale has been properly tied the motion of the capstan is reversed, so that it will wind up $f$, and thereby directly withdraw the follower and permit the application of material for another bale.

Having thus described my invention, I claim as new and desire to secure by Letters Patent—

The sliding side pieces C C, arranged to be moved by the press-follower, as specified.

ADAM W. CLARKSON.

Witnesses:
JOHN I. BONNER,
A. C. HAWTHORN.